April 28, 1925.
S. B. WILBUR
TIRE SPREADER
Filed March 17, 1923
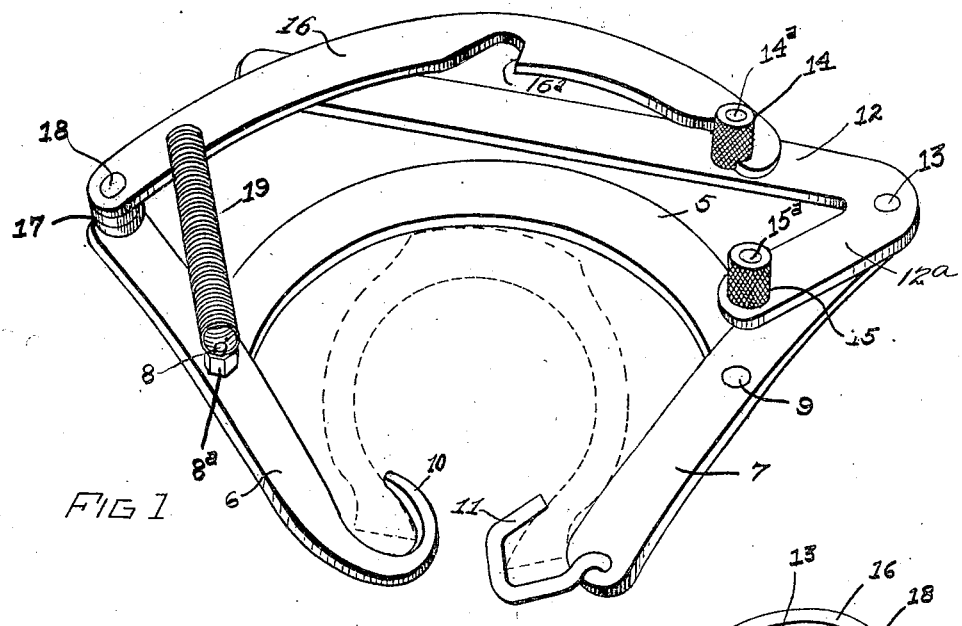
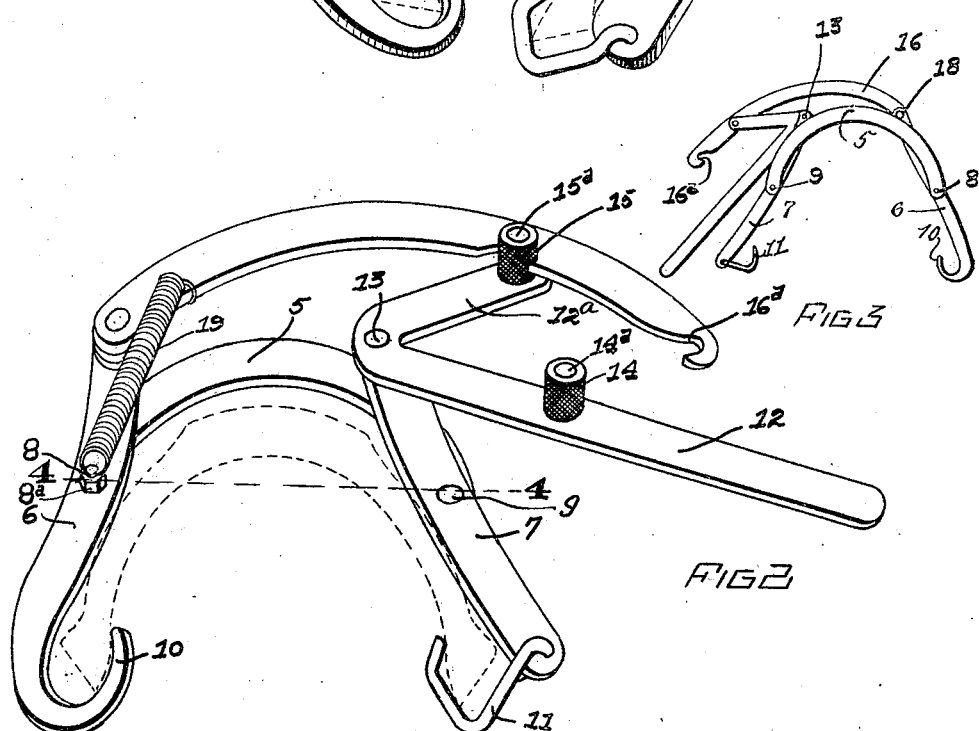
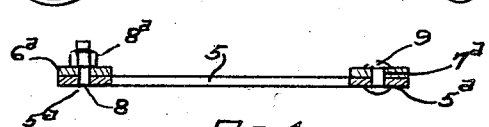
Inventor
Stephen B. Wilbur
By F. E. Shannon
Attorney Patented Apr. 28, 1925.

1,535,192

UNITED STATES PATENT OFFICE.

STEPHEN B. WILBUR, OF AKRON, OHIO.

TIRE SPREADER.

Application filed March 17, 1923. Serial No. 625,744.

*To all whom it may concern:*

Be it known that I, STEPHEN B. WILBUR, a citizen of the United States, residing at Akron, in the county of Summit and State of Ohio, have invented new and useful Improvements in Tire Spreaders, of which the following is a specification.

This invention relates to improvements in tools or devices for spreading apart the inner circumferential edges of a pneumatic tire casing and it constitutes certain improvements in devices of the character illustrated and described in United States Letters Patent Number 1,349,990, granted to me on the 17th day of August, A. D. 1920.

Objects of the invention are to provide a strong, durable device of simple, relatively inexpensive construction, which may be conveniently used to spread apart and maintain in a spread condition the inner circumferential edges of a pneumatic tire casing.

A particular object of the invention is to provide a device of the character above set forth which may be used on a tire to spread apart the inner, circumferential edges thereof and which when so used will subject each side of the tire to a like distortion and will conveniently hold the tire in an open position so that the interior surface thereof will be rendered readily accessible for the purpose of making repairs or for other purposes.

Other objects of the invention are to provide a tire spreader having a new and improved lever action and a new and improved combination of parts whereby a wide movement of parts may be obtained from a minimum amount of energy.

A further object is to provide a compact tire spreader which when used on a tire will have no projecting parts which will interfere with the handling of the tire or with the work to be done thereon.

The above objects are accomplished and additional ends are attained by the novel construction, combination and arrangement of parts herein described and illustrated in the accompanying drawing wherein I have shown a preferred embodiment of the invention, it being understood that the invention is capable of various adaptations and that changes and modifications may be made or substitutions resorted to which come within the scope of the claims hereunto appended.

In the drawings in which similar numerals of reference are used to designate like parts as the same may appear in any of the several views and in which:—

Figure 1 is a perspective view of a tire spreader constructed in accordance with this invention, the same being illustrated with tire engaging hooks positioned on a tire preparatory to spreading apart the inner, circumferential edges thereof, the tire being indicated in cross section by dotted lines.

Figure 2 is a similar perspective view illustrating the same in use during the spreading operation, the tire being indicated in cross section by dotted lines and being shown in a partly spread condition.

Figure 3 is a side elevational view showing the opposite side of the tire spreader.

Figure 4 is a cross sectional view taken as indicated by the lines 4—4 of Figure 2.

Proceeding now to a detailed description of the invention with reference to the adaptation thereof shown in the drawings, the numeral 5 denotes an arcuate member which is preferably formed of flat metal, arched edgewise to form the frame or body of the device. The central member 5 is provided at each end thereof with an arm 6 and 7 which is preferably secured thereto to swing in the same plane. The arm 6 is secured to one end of the member 5 by means of the bolt 8 which is positioned through the bore $5^a$ in the member 5 and through the bore $6^a$ in the member 6, and is secured therein by means of the nut $8^a$. The arm 7 is also provided intermediate its length with the bore $7^a$ and is secured to the member 5 as by means of a rivet 9 which is positioned through the bore $7^a$ and through the bore $5^b$ in the central member 5. The arm 6 is bent inwardly to provide a hook 10 which is adapted to be entered between the inner circumferential edges of a tire and engage one of said edges as shown by the dotted lines in Figure 1. The arm 7 is provided at the lower end thereof with a swinging hook 11 which is adapted to be swung into position to engage the other edge of the tire as shown in Figures 1 and 2. The arm 7 is provided at the upper end thereof with the lever 12 which is pivotally secured thereto by means of the pin 13 so as to swing in approximately the same plane with the arms 6 and 7. The lever 12 is provided with a relatively short end portion $12^a$ which projects from the pin 13 at an acute angle to the handle of the lever 12. The end portion 12ª is provided, adjacent the end thereof, with a cylindrical roller 15 which is secured thereto by the pin 15ª and the main portion of the lever is provided at a point in spaced relation to the pin 13 with a like roller 14 which is secured thereto by means of the pin 14ª. Both rollers 14 and 15 are preferably provided with a knurled surface and are rotatably mounted on axes extending in parallel relation to the pin 13. The arm 6 is provided at the upper end thereof with an arcuate strap having one end thereof pivotally secured thereto by means of the pin 18; the washers 17 being interposed between the arm 6 and the strap 16 to position the strap in the same plane with the rollers 14 and 15. The strap 16 is provided intermediate its length on the inner side thereof with the notch 16ª adapted to receive the roller 15 and is further provided adjacent the end thereof with the notch 16ᵇ which is adapted to receive the roller 14. The notches 16ª and 16ᵇ are the same distance apart as the rollers 14 and 15. The numeral 19 denotes a coil spring having one end thereof secured to the bolt 8 and the other end thereof secured to the strap 16, at a point in spaced relation to the pin 18.

It will be noted by an examination of Figure 3 which illustrates the opposite side of the device, that the pins 13 and 18 project outwardly from the arms 6 and 7 and are adapted to engage the upper edge of the central member 5 so that the device when operated will move the arms 6 and 7 the same number of degrees.

In operation, the lever 12 is operated to the position shown in Figure 1 with the roller 14 positioned in the notch 16ᵇ. The hook 10 is then engaged with one bead edge of the tire and the hook 11 is swung in position to engage the other bead edge thereof. The lever is then operated to spread the lower ends of the arm 6 and 7, thus moving the bead edges of the tire apart. As the lever 12 is moved, the roller 15 is brought into alinement with the notch 16ª and is entered therein and engaged by the strap 16, whereupon a further movement of the lever will cause the roller 15 to be moved from the notch 16ᵇ and will cause the inner circumferential edges of the tire to be spread further apart.

When the lever 12 has been moved to a position which will bring the pins 15ª, 13 and 18 into alinement, the tire will be retained in a spread condition, by what is commonly known as a dead center position. In actual practice, the lever is moved downwardly beside the arm 7, so that all parts of the device are positioned close to the tire and will not interfere with the work to be done thereon.

Having thus described my invention, what I claim as new and desire to secure by Letters Patent is:—

1. In a device of the class described, an arcuate frame, arms pivotally secured to each end thereof at points intermediate their length so as to swing in approximately the same plane, means on the lower ends of said arms to engage the inner circumferential edges of a tire, a rigid strap hinged to the upper end of one of said arms, a lever fulcrumed on the upper end of the other arm, said lever adapted to engage said strap and arranged to be operated to spread the lower ends of said arms apart.

2. In a device of the class described, an arcuate central member, arms pivotally secured to each end thereof so as to swing in approximately the same plane, means on the lower ends of each arm to engage the inner circumferential edge of a tire, a rigid strap hinged to the upper end of one of said arms, a lever fulcrumed on the upper end of the other arm, notches in said strap, said lever provided with members adapted to be received in said notches whereby the said strap may be engaged by the lever and the lever operated to spread the lower ends of said arms.

3. In a device of the class described, an arcuate central member, arms pivotally secured to each end thereof so as to swing in approximately the same plane, means on the lower ends of each arm to engage the inner circumferential edges of a tire, a rigid strap hinged to the upper end of one of said arms, a lever fulcrumed on the other arm, notches in said strap, said lever provided with members adapted to be received in said notches whereby the said strap may be engaged by the lever and the lever operated to spread the lower ends of said arms and spring means to retain said strap in operative engagement with said lever.

In testimony whereof I have hereunto set my hand.

STEPHEN B. WILBUR.